United States Patent
Ban et al.

(10) Patent No.: US 6,571,552 B2
(45) Date of Patent: Jun. 3, 2003

(54) EXHAUST HEAT ENERGY RECOVERY SYSTEM FOR INTERNAL COMBUSTION ENGINE

(75) Inventors: Masaki Ban, Saitama (JP); Akio Matsuzaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 43 days.

(21) Appl. No.: 09/977,315

(22) Filed: Oct. 16, 2001

(65) Prior Publication Data

US 2002/0043065 A1 Apr. 18, 2002

(30) Foreign Application Priority Data

Oct. 16, 2000 (JP) ........................................ 2000-314648

(51) Int. Cl.[7] .............................................. F02B 27/02
(52) U.S. Cl. ..................................................... 60/312
(58) Field of Search ........................ 60/312, 313, 597, 60/620

(56) References Cited

U.S. PATENT DOCUMENTS

| | | | | |
|---|---|---|---|---|
| 3,631,792 A | * | 1/1972 | Bodine | ........................ 60/299 |
| 3,856,485 A | * | 12/1974 | Mansell | ........................ 95/92 |
| 4,083,234 A | * | 4/1978 | Aono et al. | ................... 73/116 |
| 5,189,266 A | * | 2/1993 | Sasaki et al. | ............... 181/227 |
| 5,313,407 A | * | 5/1994 | Tiernan et al. | .............. 700/280 |
| 5,357,755 A | * | 10/1994 | Gillingham et al. | .......... 60/288 |

FOREIGN PATENT DOCUMENTS

JP           A4-335960           11/1992

\* cited by examiner

*Primary Examiner*—Thomas Denion
*Assistant Examiner*—Diem Tran
(74) *Attorney, Agent, or Firm*—BIrch, Stewart, Kolasch & Birch, LLP

(57) ABSTRACT

An exhaust gas recovery system for an internal combustion engine recovers the high heat energy generated by an exhaust gas clarification catalytic converter intermediately disposed in the exhaust system of the internal combustion engine as electrical energy without causing an increase in exhaust gas resistance. A stack device in a heat-driven type sound wave generating portion is provided at a one end of a resonance pipe. The resonance pipe is disposed adjacently to an exhaust gas clarification catalytic converter intermediately disposed in the exhaust system. A first end portion of the stack is heated by the heat generated by the catalytic converter, thereby providing the stack with a temperature gradient. A transducer for converting a sound wave generated by the sound wave generating portion attendant on the temperature gradient into electrical energy is provided at the other end portion of the resonance pipe.

16 Claims, 7 Drawing Sheets

EXHAUST HEAT ENERGY RECOVERY SYSTEM FOR INTERNAL COMBUSTION ENGINE

CROSS-REFERENCES TO RELATED APPLICATIONS

This nonprovisional application claims priority under 35 U.S.C. §119(a) on Patent Application No. 2000-314648 fil the entirety of which is herein incorporated by reference.

BACKGROUND OF THE INVENTION

1. Field of the Invention

The present invention relates to an exhaust heat energy recovery system, and more particularly to an exhaust heat energy recovery system effectively utilizing exhaust heat energy from an internal combustion engine for driving energy of other equipments.

2. Description of the Background Art

Exhaust heat energy recovery system for internal combustion engine are known in the background art. In particular, one exemplary system employs a heat exchanger disposed in an exhaust pipe. A high temperature fluid is taken out of the heat exchanger and is used to operate a high temperature portion of other equipment, such as an absorption type refrigerator. An example of this type of system is described in Japanese Patent Laid-open Patent Publication (KOKAI) No. 4-335960 (1992).

However, when a heat exchanger is disposed in the exhaust pipe as mentioned above, the heat exchanger contributes to exhaust resistance. This increased exhaust resistance produces deleterious effects on engine output performance, and will likely increase fuel consumption.

On the other hand, in two-wheel and four-wheel vehicles of recent years, a catalytic converter for clarification of exhaust gas is provided in the exhaust system of an engine. The heat of the clarification reaction heats the region and components around and including the catalytic converter to an extremely high temperature. Therefore, various protection methods for avoiding heat damages have been adopted.

If the high heat in this region can be utilized more effectively, it will be possible to lower the ambient temperature of the catalytic converter and to simplify and reduce the required heat damage protection measures.

SUMMARY OF THE INVENTION

The present invention overcomes the shortcomings associated with the background art and achieves other advantages not realized by the background art.

It is an object of the present invention to provide an exhaust heat energy recovery system for an internal combustion engine by which it is possible to utilize the high heat energy present in the vicinity of an exhaust gas clarification catalytic converter intermediately disposed in an exhaust system of an engine as an energy source for other equipment.

It is a further object of the present invention to provide an exhaust gas system that accomplishes the aforementioned objects without causing an increase in exhaust resistance.

These and other objects are accomplished by an exhaust heat energy recovery system for an internal combustion engine, the system comprising an exhaust system for the internal combustion engine having an exhaust gas clarification catalytic converter; a resonance pipe being disposed adjacently to the exhaust gas clarification catalytic converter, the catalytic converter intermediately being disposed between the exhaust system and the resonance pipe; a sound wave generating portion being provided at a first end portion of the resonance pipe, the sound wave generating portion including a stack device; and a transducer being provided at an other end of the resonance pipe, the transducer converting a sound wave generated by the stack device due to reception of heat from the catalytic converter into electrical energy.

These and other objects are further accomplished by an exhaust heat energy recovery system for an internal combustion engine, the system comprising an exhaust system for the internal combustion engine having an exhaust gas clarification catalytic converter; a resonance pipe being disposed adjacently to the exhaust gas clarification catalytic converter, the catalytic converter intermediately being disposed between the exhaust system and the resonance pipe; sound wave generating means being provided at a first end portion of the resonance pipe, the sound wave generating portion including a stack device; and a refrigeration portion cooled by a sound wave generated by the stack device due to reception of heat from the catalytic converter, the refrigeration portion being provided at an other end portion of the resonance pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
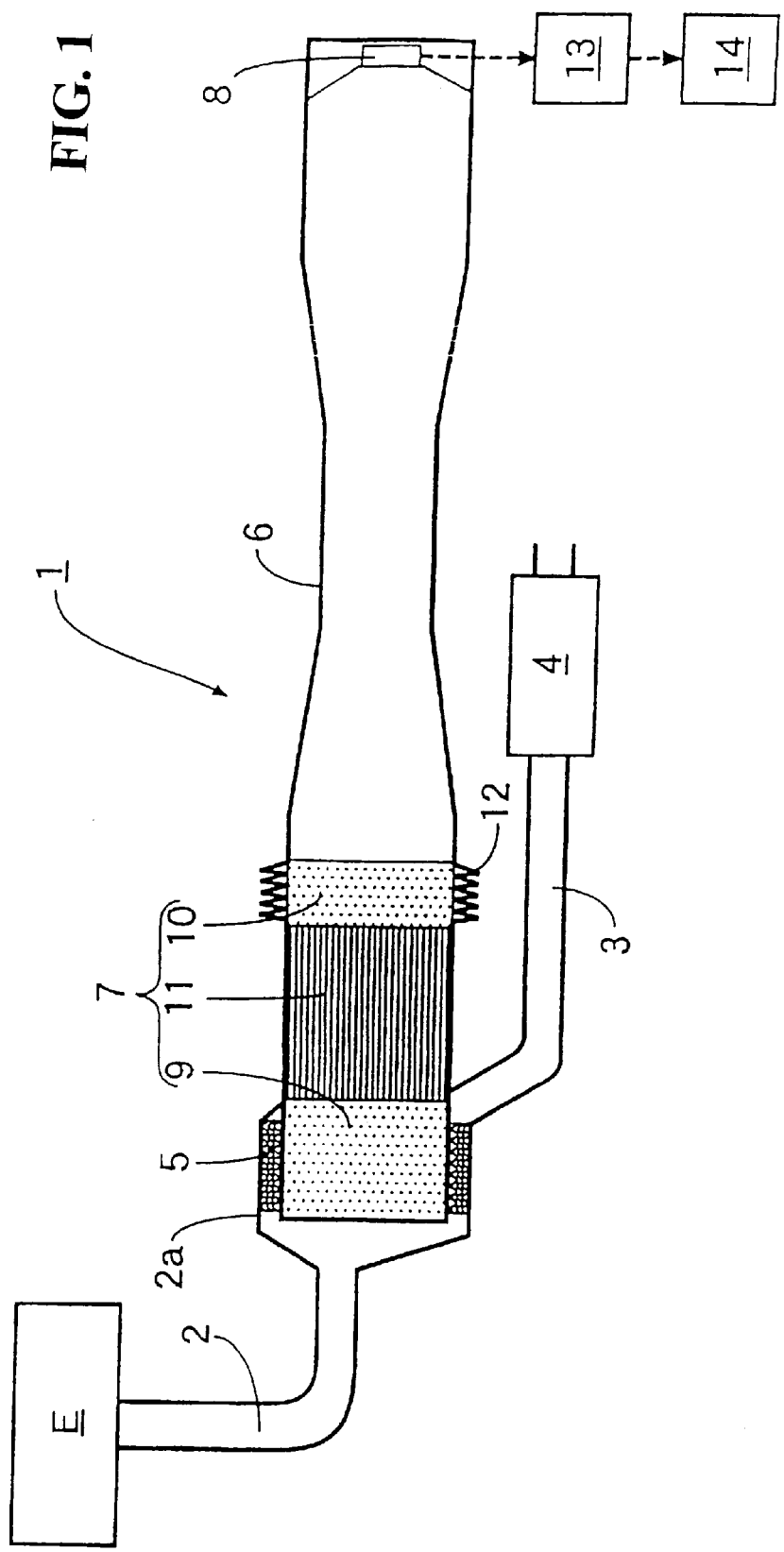
FIG. 1 is a sectional side view of an exhaust heat energy recovery system for an internal combustion engine according to a first embodiment of the present invention.

The present invention will hereinafter be described with reference to the accompanying drawings. FIG. 1 is a sectional side view of an exhaust heat energy recovery system for an internal combustion engine according to a first embodiment of the present invention.

An exhaust system 1 of an internal combustion engine E includes a front portion exhaust pipe 2 connected to an exhaust port of the internal combustion engine E, a rear portion exhaust pipe 3 connected to a peripheral wall of an enlarged diameter portion 2a provided at the downstream end of the front portion exhaust pipe 2, and a muffler 4 connected to the downstream side of the rear portion exhaust pipe 3.

A ring-form exhaust gas clarification catalytic converter 5 is fitted on the inside peripheral surface of the enlarged diameter portion 2a. A front end portion of a resonance pipe 6 closed at both ends thereof is fitted into the inside periphery of the catalytic converter 5, and a rear end portion of the resonance pipe 6 extends to a position sufficiently, e.g. enough of a distance to permit the desired variances in pressure and velocity, away from the catalytic converter 5.

A heat-driven type sound wave generating portion 7 is provided in the front end portion of the resonance pipe 6. A transducer 8 for converting the sound waves generated at the sound generating portion 7 into electrical energy is provided in the rear end portion of the resonance pipe 6. Air or a rare gas such as helium is sealed in the resonance pipe 6 as a working gas.

The sound wave generating portion 7 comprises a high temperature heat exchanger 9 and a low temperature heat exchanger 10 disposed opposite to each other in the axial direction in the front end portion of the resonance pipe 6. A high temperature stack 11 is disposed between the heat exchangers 9 and 10. The high temperature heat exchanger 9 is disposed at a location surrounded by the catalytic converter 5. Radiating fins 12 project from the outside peripheral surface of the resonance pipe 6 corresponding to the position of the low temperature heat exchanger 10. The stack 11 may include, for example, a heat storage body in which a multiplicity of stainless steel sheets are stacked together with small gaps formed therebetween.

On the other hand, the transducer 8 provided in the rear end portion of the resonance pipe 6 is a system that converts the sound waves it receives into mechanical vibration and then into electrical energy. Specifically, a combination unit of a vibrating piston and a linear electric generator or a combination unit of a vibrating plate and a piezoelectric conversion element can be used as the transducer. An output of the transducer 8 is supplied through a control device 13 to an electrical load 14 such as a battery, electrical equipment and the like. The control device can be any control means 13 available in the background art, such as a voltage regulator, an energy management device, etc.

Next, the action or operation of the first embodiment will be described hereinafter. During operation of the internal combustion engine E, the exhaust gas discharged from the engine E into the front portion exhaust pipe 2 passes sequentially through the catalytic converter 5, the rear portion exhaust pipe 3 and the muffler 4, where the exhaust gas is discharged into the atmosphere. During this process, the catalytic converter 5 chemically removes harmful components such as HC, CO, $NO_x$, particulate matter, and the like contained in the exhaust gas passing therethrough.

The heat of reaction generated at the time of the chemical removal heats the catalytic converter 5 to a temperature higher than the temperature of the exhaust gas. The heat of the catalytic converter 5 is transmitted to the stack 11 through the high temperature heat exchanger 9 surrounded by the catalytic converter 5. A first end portion of the stack nearest the catalytic converter 5 is heated to a high temperature. On the other hand, at the low temperature heat exchanger 10, cooling is conducted through radiation of heat to the atmosphere by the radiating fins 12 positioned on the exterior. Cooling of the other end portion of the stack 11 is promoted in this way.

Accordingly, a large temperature gradient is induced within the stack 11 between both ends thereof. A self-excited vibration is induced by the temperature gradient and thereby generates sound waves. The sound waves reciprocate in the resonance pipe 6 via the working gas. This type of thermo-acoustic phenomenon has been more thoroughly described in the paper "B1-17 Performance of Heat-driven Type Resonance Pipe Refrigerator" published by the Association for Low Temperature Engineering and Superconduction, Spring, 1993, the entirety of which is hereby incorporated by reference.

The frequency of the sound wave coincides with the resonance frequency of the resonance pipe 6. As a result, a standing wave is generated in the resonance pipe 6. A vibrating portion of the transducer 8 located at the rear end of the resonance pipe 6 becomes excited by the standing wave. This vibration is then converted into electrical energy as mentioned above. The electrical energy is then output to the electrical load 14 through the control device 13.

The temperature of the exhaust gas itself of an internal combustion engine has been said to be too low to generate a thermo-acoustic phenomenon. However, the present invention has been made by appreciating the fact that the heat of reaction generated at the time of clarification of the exhaust gas by the catalytic converter 5 is at a much higher temperature when compared to the exhaust gas temperature. Accordingly, the present inventors have determined that the heat of reaction and high temperature exhaust gas contains enough energy to be effectively used to generate a thermo-acoustic tube phenomenon. Accordingly, by utilizing this phenomenon, the exhaust heat energy can be recovered, e.g. as electrical energy.

In addition, no portion of the resonance pipe 6 needs to be projected into the exhaust system 1 in the aforementioned embodiment. Therefore, an increase in exhaust resistance is not caused, the output performance of the internal combustion engine E is not lowered, and fuel consumption is not increased. Further, since the sound wave generating portion 7 removes much of the heat generated by the catalytic converter 5, overheating of the catalytic converter 5 can be effectively prevented. Therefore, thermal damage protection means for the internal combustion engine E, vehicle body and the like disposed adjacent to the catalytic converter 5 can be simplified and/or eliminated.

Figure 2:
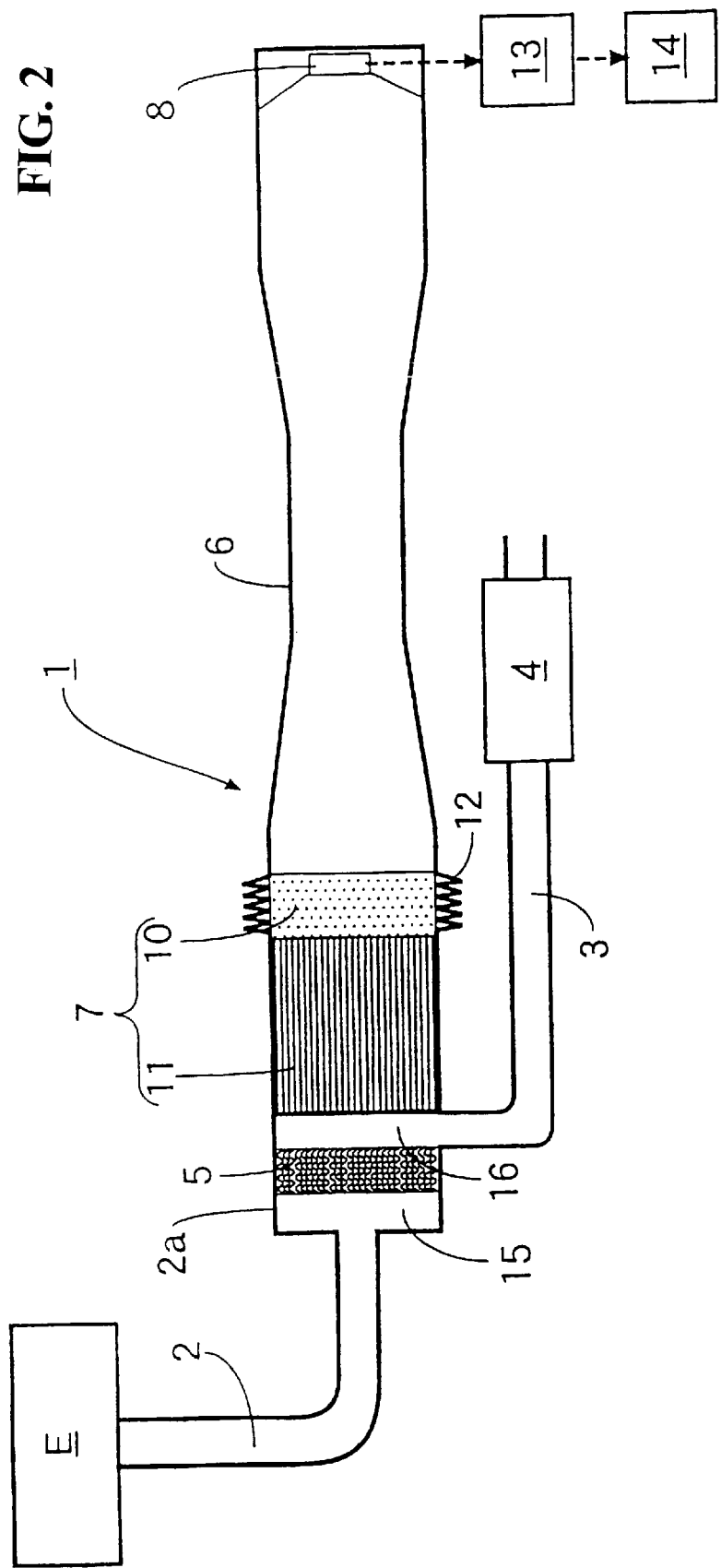
FIG. 2 is a sectional side view of an exhaust heat energy recovery system for an internal combustion engine according to a second embodiment of the present invention.

Next, a second embodiment of the present invention shown in FIG. 2 will be described hereinafter. FIG. 2 is a sectional side view of an exhaust heat energy recovery system for an internal combustion engine according to a second embodiment of the present invention. With respect to FIG. 2 through FIG. 7, common components corresponding to those in the previous described embodiment are denoted by the same reference symbols, and explanation thereof is omitted hereinafter.

In the second embodiment, a cylindrical columnar catalytic converter 5 is fitted in an enlarged diameter portion 2a of a front portion exhaust pipe 2. An inlet chamber 15 and an outlet chamber 16 are provided on the front and rear sides of the catalytic converter 5. A rear portion exhaust pipe 3 is connected to the outlet chamber 16 of the catalytic converter 5. A front end wall of a resonance pipe 6 is disposed opposite to the outlet of the catalytic converter 5 with the outlet chamber 16 disposed therebetween. A high temperature stack 11 of a sound wave generating portion 7 is disposed in close contact with the front end wall of the resonance pipe 6, and a high temperature heat exchanger 9 as in the first embodiment becomes unnecessary.

According to the second embodiment, the stack 11 of the sound wave generating portion 7 can be heated directly by the heat of the high temperature exhaust gas itself immediately after passage through the catalytic converter 5. Further, the heat radiated from the catalytic converter 5 can be used to heat the stack 11. The efficiency of heat transfer to the stack 11 is enhanced and simplification of the system 1 can be achieved by elimination of the high temperature heat exchanger 9.

Figure 3:
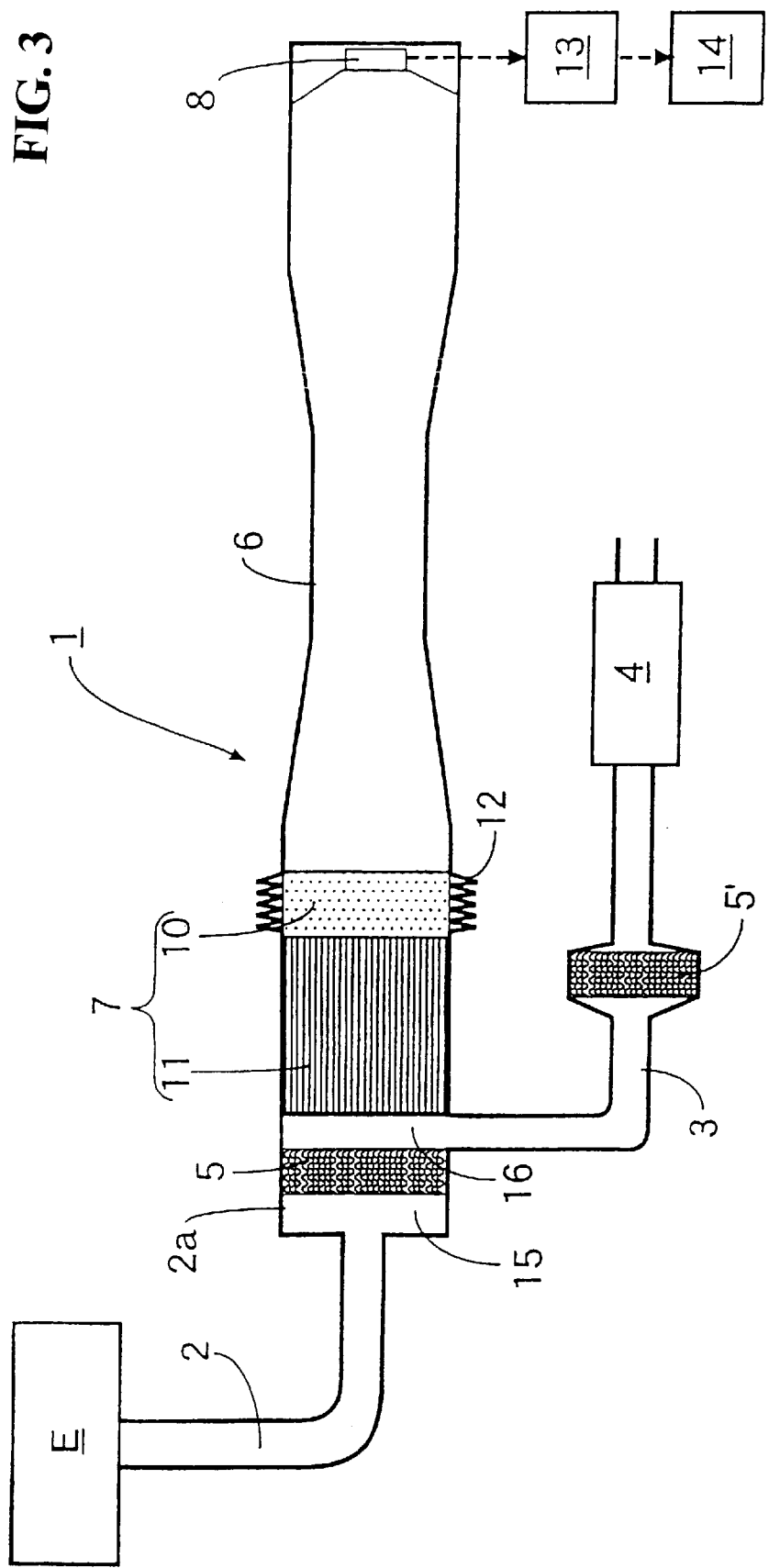
FIG. 3 is a sectional side view of an exhaust heat energy recovery system for an internal combustion engine according to a third embodiment of the present invention.

Next, a third embodiment of the present invention shown in FIG. 3 will be described hereinafter. FIG. 3 is a sectional side view of an exhaust heat energy recovery system for an internal combustion engine according to a third embodiment of the present invention.

In the third embodiment, a second catalytic converter 5' is intermediately disposed in a rear portion exhaust pipe 3. Other aspects of this embodiment are the same as in the second embodiment shown in FIG. 2. Portions corresponding to those in the second embodiment are denoted by the same reference symbols, and explanation thereof will be omitted hereinafter.

According to the third embodiment, a first catalytic converter 5 and the second catalytic converter 5' are disposed in series. The exhaust gas can be clarified in two stages, which is effective for an internal combustion engine with a large exhaust quantity.

Figure 4:
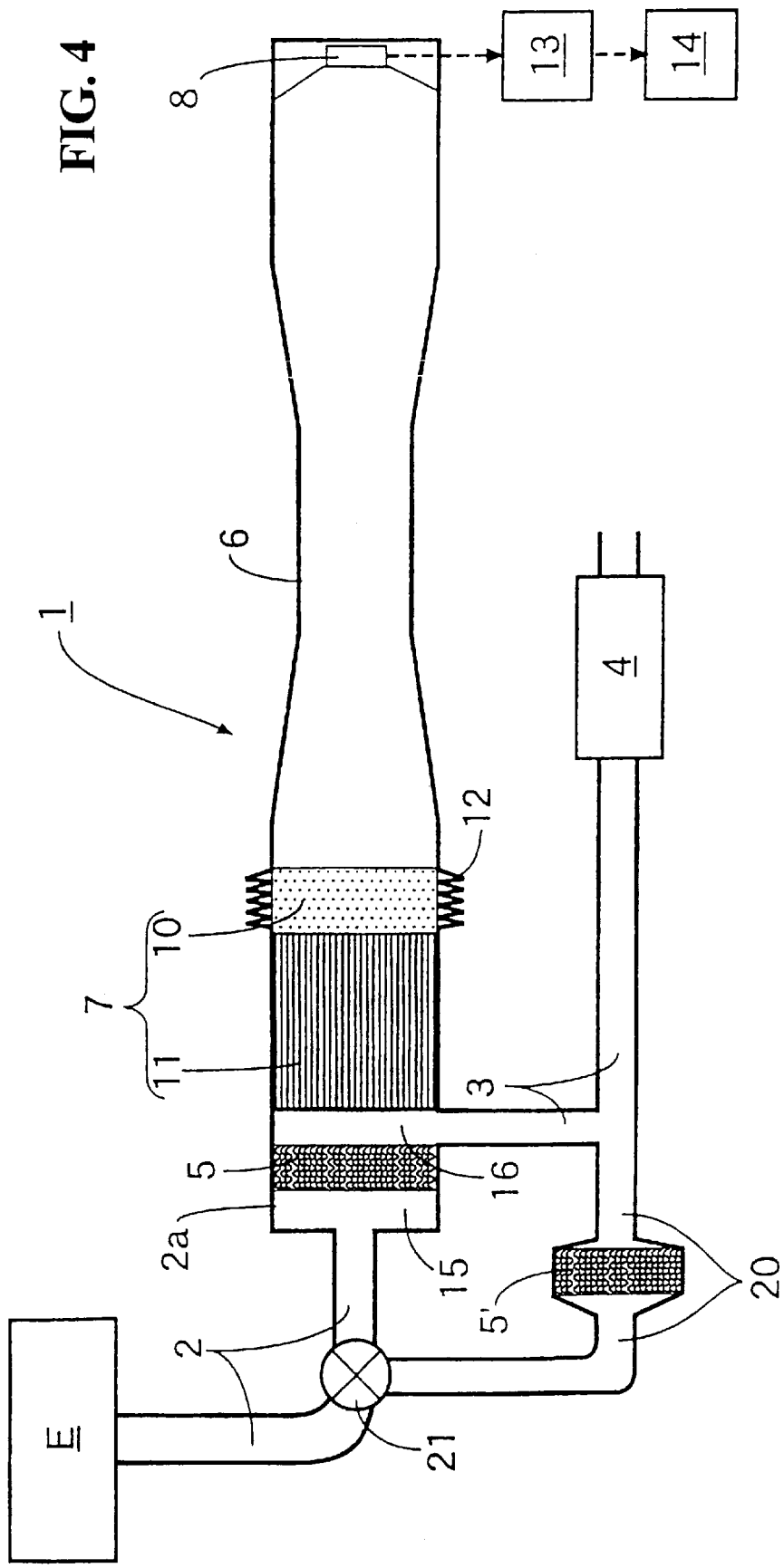
FIG. 4 is a sectional side view of an exhaust heat energy recovery system for an internal combustion engine according to a fourth embodiment of the present invention.

Next, a fourth embodiment of the present invention shown in FIG. 4 will be described hereinafter. FIG. 4 is a sectional side view of an exhaust heat energy recovery system for an internal combustion engine according to a fourth embodiment of the present invention.

In the fourth embodiment, a bypass exhaust pipe 20 is provided. The bypass exhaust pipe 20 connects front portion 2 and rear portion exhaust pipes 3 to each other in a manner that bypasses the catalytic converter 5. A second catalytic converter 5' is intermediately provided in the bypass exhaust pipe 20, and a changeover valve 21 is provided at a joint portion of the front portion exhaust pipe 2 and the bypass exhaust pipe 20.

According to the fourth embodiment, the changeover valve 21 is changed over according to desired operating conditions of an internal combustion engine E. The exhaust gas is made to flow through either one of the catalytic converters 5, 5' so as to advance activation thereof at the time of warmup operation. Alternatively, the exhaust gas is made to flow through both of the catalytic converters 5, 5' with a flow rate difference therebetween at the time of high-output operation.

This embodiment permits the balancing of clarification efficiencies of the catalytic converters 5, 5', the respective loading thereon, the degree of heating of the sound wave generating portion 7, etc. This permits increased control of the appropriate clarification function and greater durability of the catalytic converters 5, 5'.

Figure 5:
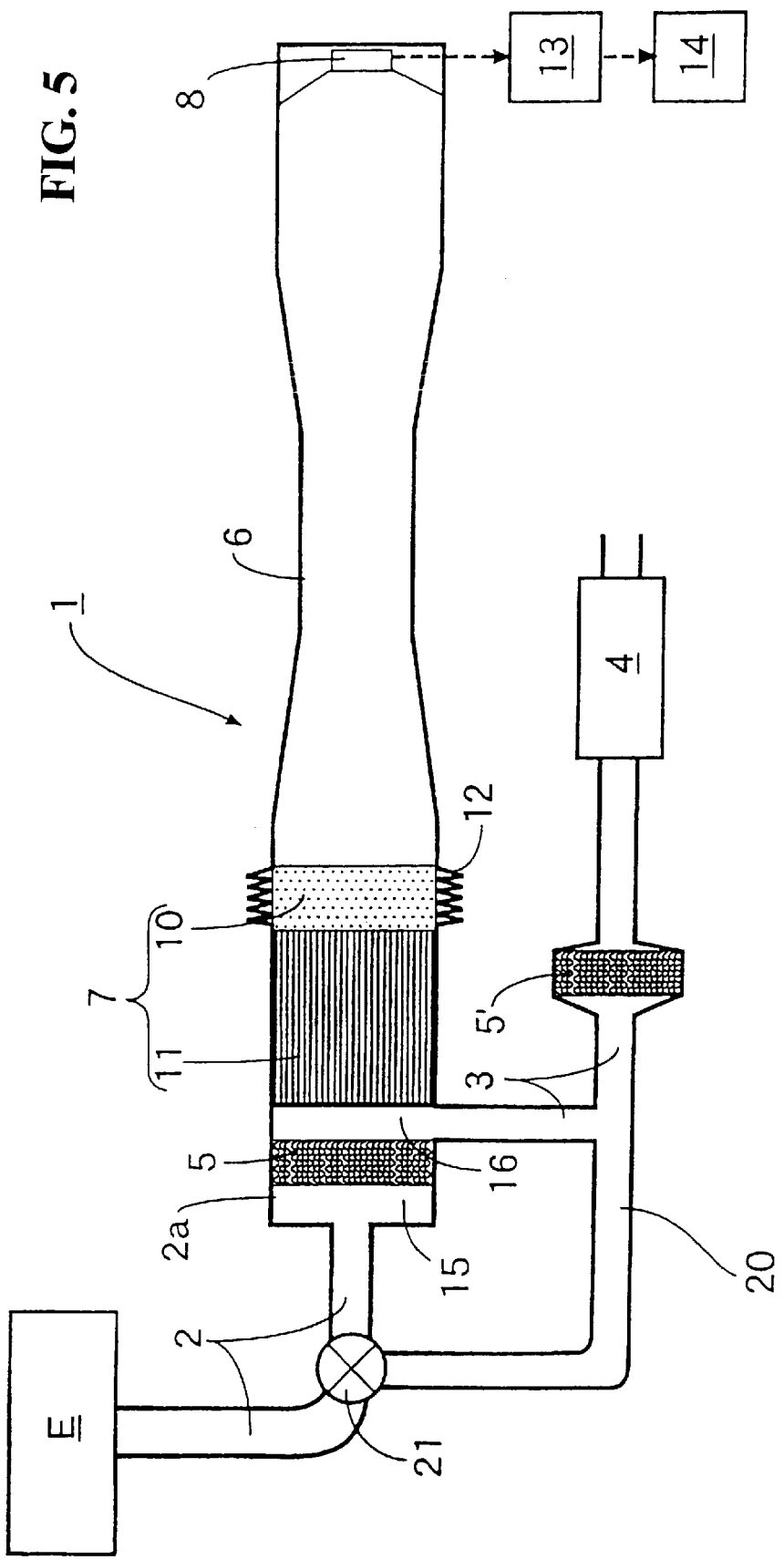
FIG. 5 is a sectional side view of an exhaust heat energy recovery system for an internal combustion engine according to a fifth embodiment of the present invention.

Next, a fifth embodiment of the present invention shown in FIG. 5 will be described hereinafter. FIG. 5 is a sectional side view of an exhaust heat energy recovery system for an internal combustion engine according to a fifth embodiment of the present invention.

In the fifth embodiment, a second catalytic converter 5' is intermediately disposed in a rear portion exhaust pipe 3 on the downstream side of a bypass exhaust pipe 20. Other aspects of constitution of this embodiment are the same as in the fourth embodiment, so that common portions corresponding to those in the fourth embodiment are denoted by the same reference symbols, and explanation thereof will be omitted hereinafter.

Figure 6:
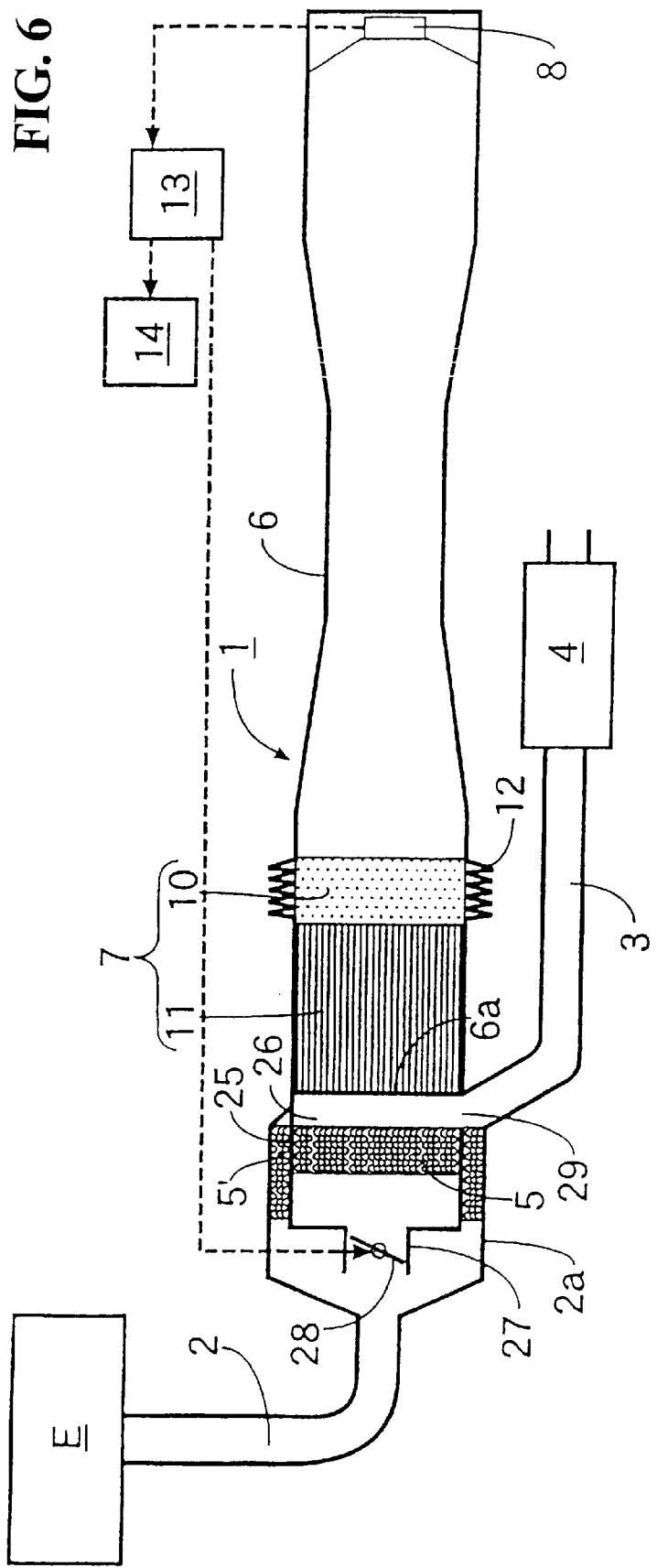
FIG. 6 is a sectional side view of an exhaust heat energy recovery system for an internal combustion engine according to the sixth embodiment of the present invention.

Next, a sixth embodiment of the present invention shown in FIG. 6 will be described hereinafter. FIG. 6 is a sectional side view of an exhaust heat energy recovery system for an internal combustion engine according to the sixth embodiment of the present invention.

In the sixth embodiment, an extension cylinder 25 forming a heating chamber 26 is adjacently connected to the front end of a resonance pipe 6. The heating chamber 26 is disposed adjacent to a high temperature stack 11 of a sound wave generating portion 7 with a partition wall 6a therebetween. The extension cylinder 25 with a cylindrical columnar catalytic converter 5 fitted therein is disposed in an enlarged diameter portion 2a of a front portion exhaust pipe 2.

An exhaust inlet pipe 27 for introducing a portion of the exhaust gas coming from the front portion exhaust pipe 2 into the heating chamber 26 is provided at a front-end wall of the extension cylinder 25. A flow rate control valve 28 for regulating the quantity of the exhaust gas introduced to the heating chamber 26 is fitted to the exhaust inlet pipe 27. The flow rate control valve 28 is controlled to open and close by a control device 13 connected to a transducer 8.

A ring form second catalytic converter 5' surrounding the extension cylinder 25 is fitted onto the inside periphery of the enlarged diameter portion 2a. The extension cylinder 25 is provided with an outlet hole 29 for the exhaust gas having passed through the catalytic converter 5. A rear portion exhaust pipe 3 is connected to the outlet hole 29 and the rear end of the enlarged diameter portion 2a.

Other aspects of this embodiment are the same as in the first embodiment shown in FIG. 1. Common portions corresponding to those in the first embodiment are denoted by the same reference symbols, and explanation thereof will be omitted hereinafter.

According to the sixth embodiment, the stack 11 of the sound wave generating portion 7 is heated directly by the heat of the high temperature exhaust gas itself immediately upon passing through the catalytic converter 5 in the heating chamber 26 and by the heat radiated from the catalytic converter 5. In addition, the flow rate control valve 28 for controlling the quantity of exhaust gas introduced into the heating chamber 26 is controlled by the control device 13 according to the output conditions of the transducer 8. Therefore, it is possible to manage or stabilize the output of the transducer 8 and to avoid overheating of the sound wave generating portion 7.

Figure 7:
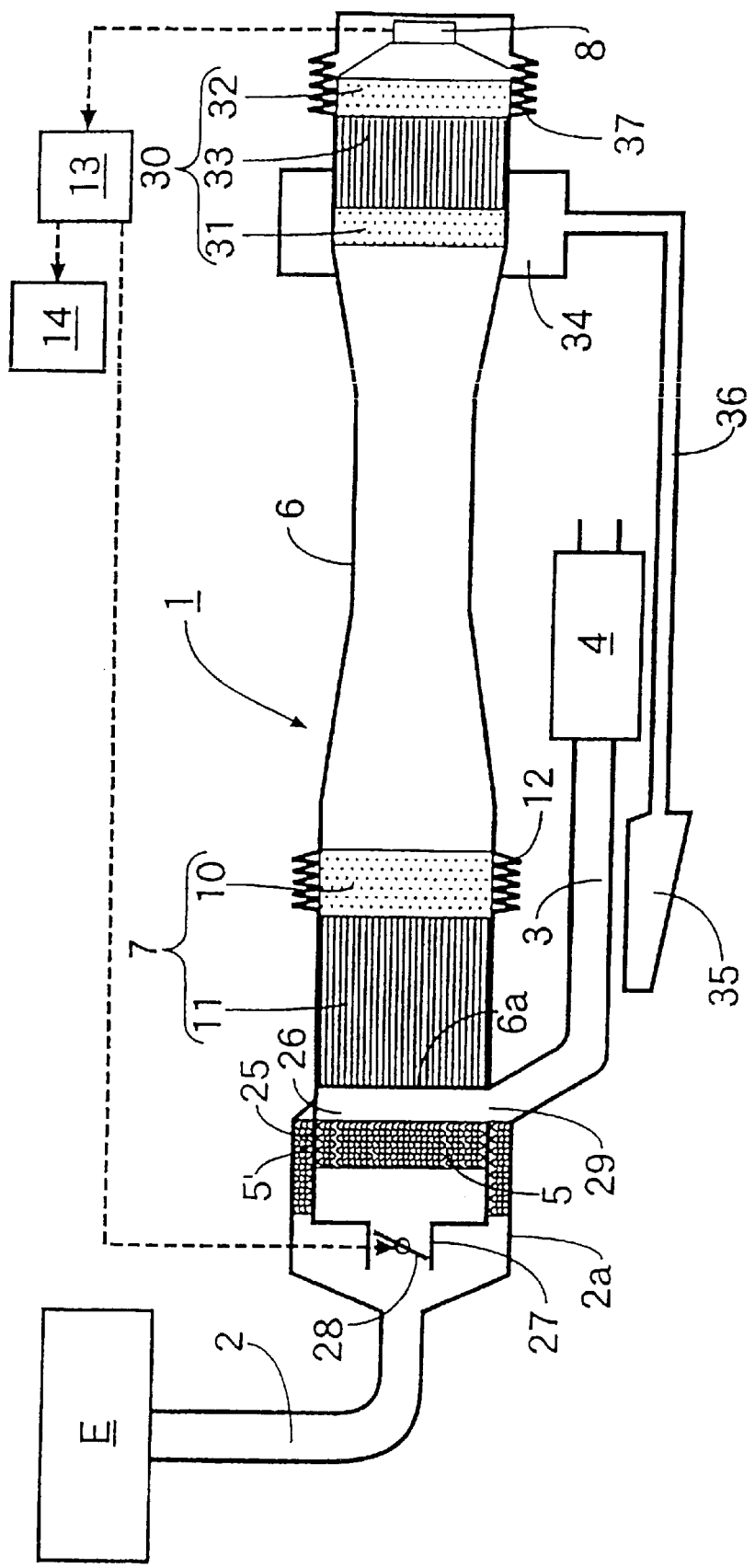
FIG. 7 is a sectional side view of an exhaust heat energy recovery system for an internal combustion engine according to the seventh embodiment of the present invention.

Finally, a seventh embodiment of the present invention shown in FIG. 7 will be described hereinafter. FIG. 7 is a sectional side view of an exhaust heat energy recovery system for an internal combustion engine according to the seventh embodiment of the present invention.

In the seventh embodiment, a refrigerating portion 30 together with a transducer 8 is provided at a rear end portion of a resonance pipe 6. The refrigerating portion 30 includes a low temperature heat exchanger 31 and a high temperature heat exchanger 32 disposed opposite to each other in the axial direction in the rear end portion of the resonance pipe 6. A low temperature stack 33 is disposed between the heat exchangers 31 and 32.

The low temperature heat exchanger 31 is disposed on the side of a sound wave generating portion 7, while the high temperature heat exchanger 32 is disposed on the side of a rear end wall of the resonance pipe 6. The low temperature stack 33 includes, for example, a heat storage body in which a multiplicity of stainless steel sheets are stacked with small gaps formed therebetween, e.g. in the same manner as a high temperature stack 11 of the sound wave generating portion 7.

Corresponding to the position of the low temperature heat exchanger 31, an insensible heat pick-up chamber 34 is provided around the outer periphery of the resonance pipe 6. The chamber 34 is communicated with a cooling panel 35 disposed at an appropriate location to be cooled on a vehicle body through a coolant conduit 36. For example, the cooling panel 35 may be disposed in a location in the vicinity of an exhaust system 1 which might receive thermal damage, and a coolant is circulated between the chamber 34 and the cooling panel 35.

Radiating fins 37 project from the outer peripheral surface of the resonance pipe 6 corresponding to the position of the high temperature heat exchanger 32.

Other aspects of the seventh embodiment are the same as in the sixth embodiment, so that in FIG. 7 the portions corresponding to those in the sixth embodiment are denoted by the same reference symbols, and explanation thereof will be omitted hereinafter.

In the sound wave generating portion 7, when the high temperature stack 11 is has a large temperature gradient by superheating of its one end from the side of the heating chamber 26 and cooling of its other end by the low temperature heat exchanger 10, a standing wave is generated in the resonance pipe 6 due to the temperature gradient, e.g. in a similar manner as in the case of the first embodiment.

In the working gas in the resonance pipe 6, there is a compression portion and an expansion portion corresponding to condensation and rarefaction portions of the standing wave. A temperature rise occurs due to adiabatic compression at the compression portion, while a temperature fall occurs due to adiabatic expansion at the expansion portion. The high temperature stack 11 of the sound wave generating portion 7 is located at the temperature rise portion, while a low temperature stack 33 of the refrigerating portion 30 is located at the temperature fall portion. Accordingly, the sound wave transports heat from the low temperature stack 33 to the high temperature stack 11.

As a result, at the refrigerating portion 30, the low temperature stack 33 absorbs heat from the low temperature heat exchanger 31. The insensible heat of the low temperature heat exchanger 31 is taken out into the insensible heat pick-up chamber 34, and is transferred through the conduit 36 to the cooling panel 35 (thereby cooling the cooling panel 35). In the case shown, the cooling panel 35 optionally cools a desired portion of the exhaust system 1, so that thermal damage of the components in the vicinity thereof can be prevented.

As described hereinabove, according to a first characteristic feature of the present invention, a stack of a sound wave generating portion provided at one end portion of a resonance pipe is disposed adjacently to an exhaust gas clarification catalytic converter intermediately disposed in an exhaust system of an internal combustion engine. A transducer for converting the sound wave generated by the stack due to reception of heat from the catalytic converter into electrical energy is provided at the other end portion of the resonance pipe. An output from the transducer is supplied to an electrical load.

A thermo-acoustic tube phenomenon is generated by the high temperature heat of reaction generated at the time of clarification of the exhaust gas by the catalytic converter. By utilizing this phenomenon, exhaust heat energy can be recovered as electrical energy, which can be effectively utilized for driving desired electrical load(s).

In addition, no portion of the resonance pipe needs to project into the exhaust system. Therefore, an increase in exhaust resistance is avoided, output performance of the internal combustion engine is not lowered, and combustion consumption is not increased. Furthermore, the sound wave generating portion removes heat that is generated by the catalytic converter, whereby overheating of the catalytic converter can be prevented. Therefore, thermal damage protection means for the internal combustion engine, vehicle body and the like adjacent to the catalytic converter can be simplified and/or eliminated.

In addition, according to a second characteristic feature of the present invention, a control valve for controlling the quantity of exhaust gas introduced into the catalytic converter is provided in the exhaust system. The control valve is controlled according to output conditions of the transducer. Therefore, by automatic control of the quantity of exhaust gas introduced into the catalytic converter, it is possible to achieve stabilization of the transducer output and to prevent overheating of the sound wave generating portion.

Further, according to a third characteristic feature of the present invention, a stack in a heat-driven type sound wave generating portion provided at a one end portion of a resonance pipe is disposed adjacently to an exhaust gas clarification catalytic converter intermediately disposed in an exhaust system of an internal combustion engine. A refrigerating portion cooled by the sound wave generated by the stack due to reception of heat from the catalytic converter is provided at the other end portion of the resonance pipe.

Therefore, the high temperature heat of reaction generated at the time of clarification of exhaust gas by the catalytic converter can generate a thermo-acoustic tube phenomenon. By utilizing this phenomenon, exhaust heat energy can be recovered as driving energy for the refrigerating portion. In addition, since no portion of the resonance pipe projects into the exhaust system, an increase in exhaust resistance is avoided, the output performance of the internal combustion engine is not lowered, and fuel/combustion consumption is not increased.

Further, the sound wave generating portion removes the heat generated by the catalytic converter, whereby overheating of the catalytic converter can be effectively prevented, and thermal damage protection means for the internal combustion engine, vehicle body and the like adjacent to the catalytic converter can be simplified and/or eliminated.

Furthermore, according to a fourth characteristic feature of the present invention, the catalytic converter is disposed so as to surround a high temperature portion of the sound wave generating portion. The heat generated at the catalytic converter can be efficiently transferred to the high temperature portion of the sound wave generating portion, whereby an effective operation of the sound wave generating portion can be secured.

Furthermore, according to a fifth characteristic feature of the present invention, the catalytic converter is disposed so that its exhaust outlet is proximate to and opposed to the high temperature portion of the sound wave generating portion. The heat generated at the catalytic converter and the heat of the high temperature exhaust gas coming out of the catalytic converter can be transferred to the high temperature portion of the sound wave generating portion, whereby a more effective operation of the sound wave generating portion can be secured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust heat energy recovery system for an internal combustion engine, said system comprising:
    an exhaust system for the internal combustion engine having an exhaust gas clarification catalytic converter;
    a resonance pipe being disposed adjacently to said exhaust gas clarification catalytic converter, said catalytic converter intermediately being disposed between the exhaust system and the resonance pipe;
    a sound wave generating portion being provided at a first end portion of said resonance pipe, said sound wave generating portion including a stack device; and
    a transducer being provided at an other end of said resonance pipe, said transducer converting a sound wave generated by said stack device due to reception of heat from said catalytic converter into electrical energy.

2. The exhaust heat energy recovery system according to claim 1, further comprising electrical control means, wherein an output from said transducer is supplied to said electrical control means.

3. The exhaust heat energy recovery system according to claim 2, further comprising:
    a control valve controlling a quantity of exhaust gas introduced into said catalytic converter, wherein said control valve is controlled according to an output condition of said transducer.

4. An exhaust heat energy recovery system for an internal combustion engine, said system comprising:
    an exhaust system for the internal combustion engine having an exhaust gas clarification catalytic converter;
    a resonance pipe being disposed adjacently to said exhaust gas clarification catalytic converter, said catalytic converter intermediately being disposed between the exhaust system and the resonance pipe;
    sound wave generating means being provided at a first end portion of said resonance pipe, said sound wave generating portion including a stack device; and
    a refrigeration portion cooled by a sound wave generated by said stack device due to reception of heat from said catalytic converter, said refrigeration portion being provided at an other end portion of said resonance pipe.

5. The exhaust heat energy recovery system according to claim 1, wherein said catalytic converter surrounds a high temperature portion of said sound wave generating portion.

6. The exhaust heat energy recovery system according to claim 2, wherein said catalytic converter surrounds a high temperature portion of said sound wave generating portion.

7. The exhaust heat energy recovery system according to claim 3, wherein said catalytic converter surrounds a high temperature portion of said sound wave generating portion.

8. The exhaust heat energy recovery system according to claim 4, wherein said catalytic converter surrounds a high temperature portion of said sound wave generating portion.

9. The exhaust heat energy recovery system according to claim 4, further comprising a transducer being provided at an other end of said resonance pipe, said transducer converting a sound wave generated by said stack device due to reception of heat from said catalytic converter into electrical energy.

10. The exhaust heat energy recovery system according to claim 9, further comprising electrical control means, wherein an output from said transducer is supplied to said electrical control means.

11. The exhaust heat energy recovery system according to claim 9, further comprising:
    a control valve controlling a quantity of exhaust gas introduced into said catalytic converter, wherein said control valve is controlled according to an output condition of said transducer.

12. The exhaust heat energy recovery system according to claim 11, further comprising a second catalytic converter.

13. The exhaust heat energy recovery system according to claim 2, further comprising a second catalytic converter.

14. The exhaust heat energy recovery system according to claim 2, wherein said catalytic converter includes an exhaust outlet, said exhaust outlet being proximate to and opposed to a high temperature portion of said sound wave generating portion.

15. The exhaust heat energy recovery system according to claim 3, wherein said catalytic converter includes an exhaust outlet, said exhaust outlet being proximate to and opposed to a high temperature portion of said sound wave generating portion.

16. The exhaust heat energy recovery system according to claim 4, wherein said catalytic converter includes an exhaust outlet, said exhaust outlet being proximate to and opposed to a high temperature portion of said sound wave generating portion.

* * * * *